United States Patent
Merkel et al.

(10) Patent No.: US 10,688,870 B2
(45) Date of Patent: Jun. 23, 2020

(54) METHOD AND DEVICE FOR CONTROLLING ENERGY SOURCES FOR SUPPLYING MAIN AND AUXILIARY AIR, IN PARTICULAR OF A RAIL VEHICLE

(71) Applicant: KNORR-BREMSE SYSTEME FÜR SCHIENENFAHRZEUGE GMBH, Munich (DE)

(72) Inventors: Thomas Merkel, Hürth (DE); Boris Wittich, Munich (DE); Martin Kutschker, Dietramszell (DE); Martin Linner, Schwindeg (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 165 days.

(21) Appl. No.: 15/759,365

(22) PCT Filed: Sep. 6, 2016

(86) PCT No.: PCT/EP2016/070903
§ 371 (c)(1),
(2) Date: Mar. 12, 2018

(87) PCT Pub. No.: WO2017/042141
PCT Pub. Date: Mar. 16, 2017

(65) Prior Publication Data
US 2018/0178653 A1 Jun. 28, 2018

(30) Foreign Application Priority Data
Sep. 11, 2015 (DE) .......................... 10 2015 115 369

(51) Int. Cl.
*B60L 1/00* (2006.01)
*B60L 5/00* (2006.01)
(Continued)

(52) U.S. Cl.
CPC ................ *B60L 1/003* (2013.01); *B60L 5/32* (2013.01); *B60L 9/00* (2013.01); *B60L 2200/26* (2013.01)

(58) Field of Classification Search
CPC .... B60L 1/00; B60L 1/003; B60L 5/00; B60L 5/32; B60L 9/00; B60L 2200/26;
(Continued)

(56) References Cited

U.S. PATENT DOCUMENTS 7,520,572 B2 * 4/2009 Hatipoglu ............... B60T 8/175
303/15
8,078,378 B2 * 12/2011 Bradley, IV ............ B60T 7/122
303/5

(Continued)

FOREIGN PATENT DOCUMENTS

AT 151493 B 11/1937
AT 388900 B 9/1989
(Continued)

OTHER PUBLICATIONS

Russian Search Report corresponding to Russian Application 2018112845/11, dated Dec. 13, 2018.
(Continued)

*Primary Examiner* — Yonel Beaulieu
(74) *Attorney, Agent, or Firm* — Barnes & Thornburg LLP

(57) ABSTRACT

A device and method controls the different energy sources for supplying a vehicle with main and auxiliary air, for which compressed air is produced for pressurizing a main air tank and an auxiliary air tank using at least one compressor. That compressor is driven via a respective associated electric motor, wherein the main air is supplied via an external primary energy source and the auxiliary air is supplied at least partially via an internal secondary energy source which
(Continued)

is weaker in contrast. There is a shift between the two different energy sources depending on the operating status of the vehicle, wherein the auxiliary air supply is switched off by decoupling the electric motor from the secondary energy source.

13 Claims, 1 Drawing Sheet

(51) Int. Cl.
  *B60L 9/00* (2019.01)
  *B60L 5/32* (2006.01)
(58) Field of Classification Search
  CPC ........ B60T 13/00; B60T 13/263; B60T 13/36; B60T 13/40; B60T 15/00
  See application file for complete search history.

(56) References Cited

U.S. PATENT DOCUMENTS

2006/0197376 A1* 9/2006 Herbst ...................... B60T 8/46
  303/127

2016/0221447 A1  8/2016  Urra et al.

FOREIGN PATENT DOCUMENTS

| | | |
|---|---|---|
| DE | 3613069 A1 | 10/1987 |
| DE | 10336058 B3 | 1/2005 |
| DE | 102008056479 A1 | 5/2010 |
| DE | 102010008636 A1 | 8/2011 |
| DE | 102013009802 B3 | 10/2014 |
| DE | 102013109475 A1 | 3/2015 |
| JP | 6132701 U | 2/1986 |
| JP | H0698409 A | 4/1994 |
| RU | 94032675 A | 9/1996 |
| RU | 2100220 C1 | 12/1997 |
| WO | 2012128770 A1 | 9/2012 |

OTHER PUBLICATIONS

Search Report for International Patent Application No. PCT/EP2016/070903; dated Nov. 25, 2016.

Japanese Office Action corresponding to JP 20418-512975, dated Apr. 10, 2019.

* cited by examiner

METHOD AND DEVICE FOR CONTROLLING ENERGY SOURCES FOR SUPPLYING MAIN AND AUXILIARY AIR, IN PARTICULAR OF A RAIL VEHICLE

CROSS-REFERENCE AND PRIORITY CLAIM

This patent application is a U.S. National Phase of International Patent Application No. PCT/EP2016/070903, filed Sep. 6, 2016, which claims priority to German Patent Application No. 10 2015 115369.6, filed Sep. 11, 2015, the disclosures of which are incorporated herein by reference in their entirety.

FIELD

Disclosed embodiments relate to a method and to a device for actuating different electrical energy sources for the primary and auxiliary air supply of a vehicle, in particular of a rail vehicle, having at least one compressor which is driven via a respectively assigned electric motor, for supplying at least one main air vessel and at least one auxiliary air vessel with compressed air, wherein an external primary energy source implements the primary air supply, and at least one internal secondary energy source, which is weaker in comparison with the former, at least partially implements the auxiliary air supply, and switching-over means for switching the two different energy sources on and off depending on the operating status of the vehicle are provided.

SUMMARY

Disclosed embodiments provide a method and a device for actuating different electrical energy sources for the primary and auxiliary air supply of a vehicle with which switching over between the energy sources in a way which is adapted to the operating status of the vehicle is achieved without adversely affecting the primary and auxiliary air supply of the vehicle.

BRIEF DESCRIPTION OF THE FIGURES

Further measures which improve the invention are presented in more detail below together with the description of an exemplary embodiment of the invention on the basis of the figures, in which.

DETAILED DESCRIPTION

Figure 1:
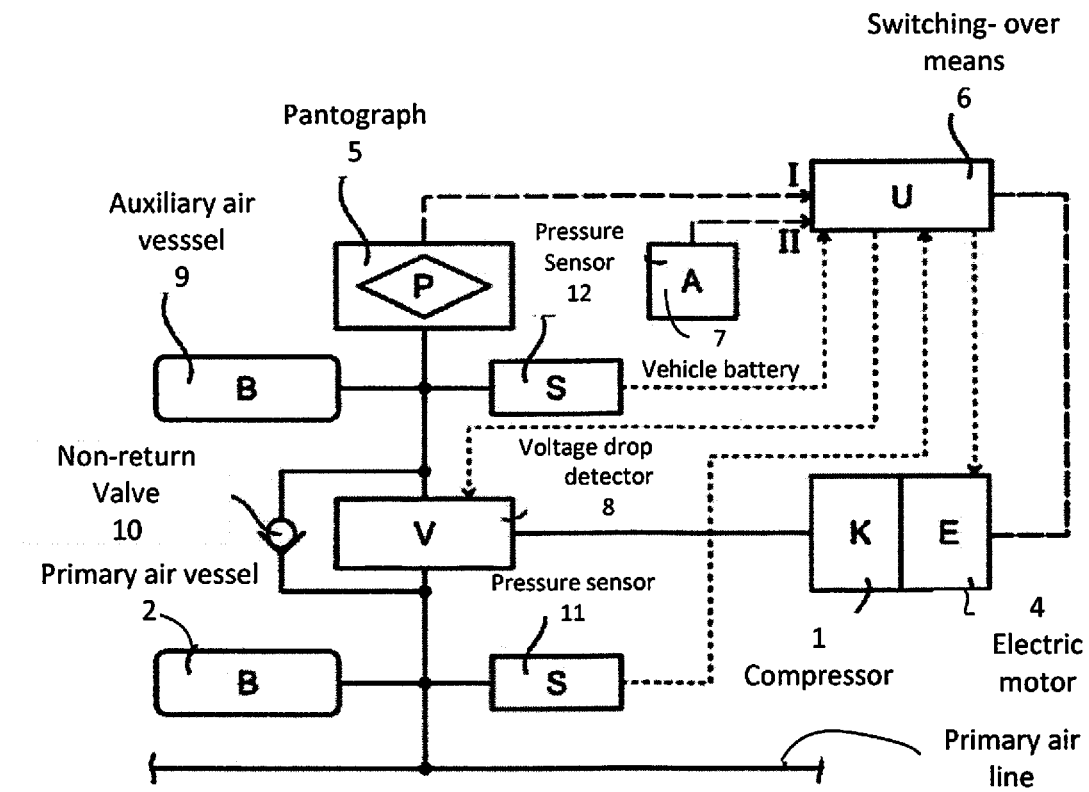
FIG. 1 shows a schematic illustration of a device for the primary and auxiliary air supply of a rail vehicle using a primary energy source and a secondary energy source for the auxiliary air supply.

Disclosed embodiments have utility that extends mainly to the construction of rail vehicles, in particular to electrically operated rail vehicles. In this context compressed air is used as the operating energy for supplying pneumatic assemblies such as, for example, a vehicle brake system, and the compressed air being generated from the ambient air by a compressor driven by an electric motor. In addition to a primary air supply with the pneumatic assemblies which are supplied via a primary air vessel, in the vehicles which are of interest here what is referred to as auxiliary air is also required in order to generate the necessary pneumatic energy to upgrade the vehicle in the scope of an auxiliary air supply. Upgrading of the vehicle is understood to be a process which changes the vehicle from the deactivated state into an operationally ready state. In an operationally ready state the vehicle is connected to its primary energy source, that is to say, for example, to an electrical overhead line or a busbar. The upgrading occurs in the case of an electrical overhead line, in particular, by moving a pantograph from the retracted position into the extended position via a pneumatic actuator drive, optionally a pneumatic cylinder. In the extended state the pantograph provides the electrical energy supply for the vehicle via the electrical overhead line; accordingly an electrical main switch is also activated within the scope of the upgrading.

For the purposes of upgrading, according to the generally known prior art a separate auxiliary air compressor is usually operated on board the vehicle and supplied with electrical energy by the vehicle battery and has a relatively low delivery capacity in contrast with the main compressor for the primary air supply. This requires the provision of such an auxiliary air compressor including the necessary piping and actuate means onboard the vehicle.

DE 10 2013 109 475 A1 discloses another technical solution in which such a separate auxiliary air compressor can be dispensed with since its function is also performed by the main compressor of the vehicle. For the auxiliary air supply via the compressor, its driving electric motor is operated via a frequency inverter with the electrical energy which is made available by the vehicle battery. The drive energy which is generated in this way is sufficient to operate the compressor at a low rotational speed, and the compressed air to the auxiliary air supply is branched off from a secondary line of the compressed air feed line to the primary air vessel. This auxiliary air branching off takes place behind the air dryer unit which is connected downstream of the compressor so that dried auxiliary air is available. Further details of the coordinated actuate of the different electrical energy sources for the primary and auxiliary air supply of the vehicle are not disclosed.

Disclosed embodiments provide process technology wherein an auxiliary air supply is disconnected by uncoupling the electric motor from the secondary energy source, optionally the vehicle battery if the pressure in the auxiliary air vessel has reached a minimum pressure value of optionally 8 bar which is sufficient to upgrade the vehicle via auxiliary air, and/or if the primary energy source, optionally an overhead line connection, has been connected after upgrading of the vehicle through operation with auxiliary air, and the assigned electric main switch of the vehicle is activated, with the result that the operational ready state of the vehicle is ensured with the primary energy source.

Disclosed embodiments utilize simple means in terms of actuate technology to ensure that switching over from the auxiliary air supply to the primary air supply occurs when it is ensured that sufficient auxiliary air has been generated to upgrade the vehicle and change over the operating status into an operationally ready state. If the primary energy source is connected after the upgrading, the operating status of the vehicle can change in all cases into an operationally ready state. Optional uncoupling of the secondary energy source reduces the consumption of electrical energy from the vehicle battery. With the solution according to the disclosed embodiments, the electric motor of the compressor can be supplied, depending on availability, from one energy source in the non-upgraded state and from another energy source in the upgraded state.

In other words, in the non-upgraded state the vehicle is optionally supplied with voltage via the secondary energy source, in order initially to fill the auxiliary air vessel within the scope of an auxiliary air supply. Using pneumatic energy of the auxiliary air vessel, the vehicle is subsequently connected to the primary energy source and is then in the upgraded state. This can occur, for example, by applying a pantograph, closing an electric main switch and/or by the electrical connection to a busbar.

According to a measure which improves the disclosed embodiments further, it is proposed that the secondary energy source is switched off if the voltage thereof has dropped to such a degree that other electrical consumers which are prioritized over the electric motor of the compressor can no longer be supplied with sufficient energy. Such prioritized electrical consumers are, for example, the lighting system in machine rooms or driver cabs, the tail lights or the anti-skid protection. Using the voltage drop detection it is easily possible to determine whether the secondary energy source can supply sufficient electrical energy for the auxiliary air supply. In this context, technical safety requirements of the vehicle are simultaneously taken into account. Furthermore, it is proposed that the connection of the primary energy source is optionally carried out offset in terms of timing with respect to the preceding switching off of the secondary energy source for the auxiliary air supply. Only if the secondary energy source is reliably disconnected from the primary circuit via a suitable switching-over means, for example a contactor, is the primary energy source subsequently connected. A brief dead time within the scope of this switching over process avoids a short-circuit of the energy sources.

According to another measure which improves the disclosed embodiments, the output frequency of a frequency inverter for operating the electric motor, which is embodied as a three-phase motor is set in such a way that the electric motor is operated in accordance with a characteristic curve as a function of the counter-pressure and/or the battery input voltage. The electric motor can be operated, for example, with a higher rotational speed in the case of a low counter-pressure than in the case of a relatively high counter-pressure. This ensures uniform loading of the electric motor with a maximized delivery capacity of the connected compressor, without overloading occurring. This actuate of the rotational speed of the electric motor is optionally carried out in accordance with a U/F characteristic curve diagram. The output frequency of the frequency inverter can be regulated in the U/F characteristic curve diagram or else outside this characteristic curve diagram. The frequency inverter can correspondingly be regulated with respect to its output frequency with a rotational speed sensor on the electric motor of the compressor and/or a pressure sensor on the auxiliary air vessel.

With respect to a device in terms of technical equipment for implementing the method described above, which comprises, as a switching-over means, a primary contactor for connecting the primary energy source and a secondary contactor for connecting the secondary source, it is proposed that a boost converter for generating the voltage which is specified by the secondary energy source is provided between the secondary energy source and the secondary contactor. With the boost converter it is therefore possible to raise the relatively low supply voltage of a vehicle battery, for example, to the level of the operating voltage of the electric motor, in order to operate the latter within the scope of the auxiliary air supply when the vehicle is upgraded.

In addition, a frequency inverter, which, as already described above, actuates the rotational speed of the electric motor via an adjustable output frequency, may be arranged between the secondary contactor and the electric motor which is embodied, as a three-phase motor.

According to a measure which further improves the device according to the disclosed embodiments, a voltage monitoring unit may be provided for operation with the secondary energy source, in order to adapt the voltage of the frequency inverter and/or of the boost converter to the operating voltage of the secondary energy source. This prevents the secondary energy source from being possibly overloaded during the auxiliary air supply.

According to FIG. 1, within the scope of a primary and of an auxiliary air supply of a rail vehicle which is operated electrically via an overhead line connection (not illustrated in more detail), a compressor 1 for generating compressed air for filling a primary air vessel 2 and a primary air vessel line 3 which is connected thereto is provided. The compressor 1 is driven by an electric motor 4. The electrical energy for driving the electric motor 4 is drawn via a pantograph 5 via an overhead line connection during the normal operation of the rail vehicle. The electrical energy which is tapped via the pantograph 5 is made available (dashed line) as a primary energy source I to, inter alia, the electric motor 4 of the compressor 1 via switching-over means 6 which are described in particular below in more detail. A vehicle battery 7 is provided as a secondary energy source II in parallel with the primary energy source II.

In order to upgrade the vehicle, a pneumatic actuator drive which is assigned to the pantograph 5 is extended with the auxiliary air which is generated by the compressor 1 using the secondary energy source II, since in this operating status of the vehicle there is still no electrical energy available from the overhead line, that is to say the primary energy source I is not yet connected. The electrical energy which can be applied by the secondary energy source II is sufficient in this phase of upgrading of the vehicle to operate the compressor 1 with a low delivery capacity, which is sufficient to extend the pantograph 5 via its pneumatic actuator drive.

For this purpose, the auxiliary air which is generated with battery operation by the compressor 1 is fed, in accordance with the switching-over means 6, to an auxiliary air vessel 9 via a switching valve 8 which is embodied here as an electropneumatic 3/2-way valve.

The auxiliary air vessel 9 supplies the auxiliary air for driving the pneumatic actuator drive of the pantograph 5. Outside the phase of upgrading the rail vehicle, the switching valve 8 feeds the compressed air generated by the compressor 1 to the primary air supply in the primary air vessel 2 of the vehicle. The filling of the primary air vessel 2 optionally takes place via the primary energy source I during the normal operation of the vehicle.

If there is not yet sufficient compressed air in the primary air vessel 2 at the time of upgrading of the vehicle, the emptied auxiliary air vessel 9 can also be filled therefrom. For this purpose, a non-return valve 10, which is connected in parallel with the switching valve 8, is provided with a forward flow direction from the primary air vessel 2 to the auxiliary air vessel 9.

An electronic controller of the switching-over means 6 predefines the electrical switching signal (dotted line) to the electropneumatic switching valve 8 in order to implement the primary or auxiliary air supply. A pressure signal of a first pressure sensor 11 at the primary air vessel 2 and of a second pressure sensor 12 at the auxiliary air vessel 9 is fed (dotted lines) for this purpose to the switching-over means 6 on the signal input side. The electronic controller of the switching-over means 6 determines therefrom the switching signal for the electropneumatic switching valve 8 in accordance with the logic explained above.

With respect to the switching valve 8, in a first switch position of the 3/2-way valve the supply pressure which is generated by the compressor 1 is fed to the auxiliary air vessel 9 within the scope of the auxiliary air supply, in particular in the phase of upgrading of the vehicle, and in a second switch position the supply pressure which is generated by the compressor 1 is fed to the primary air vessel 2 within the scope of the primary air supply.

Figure 2:
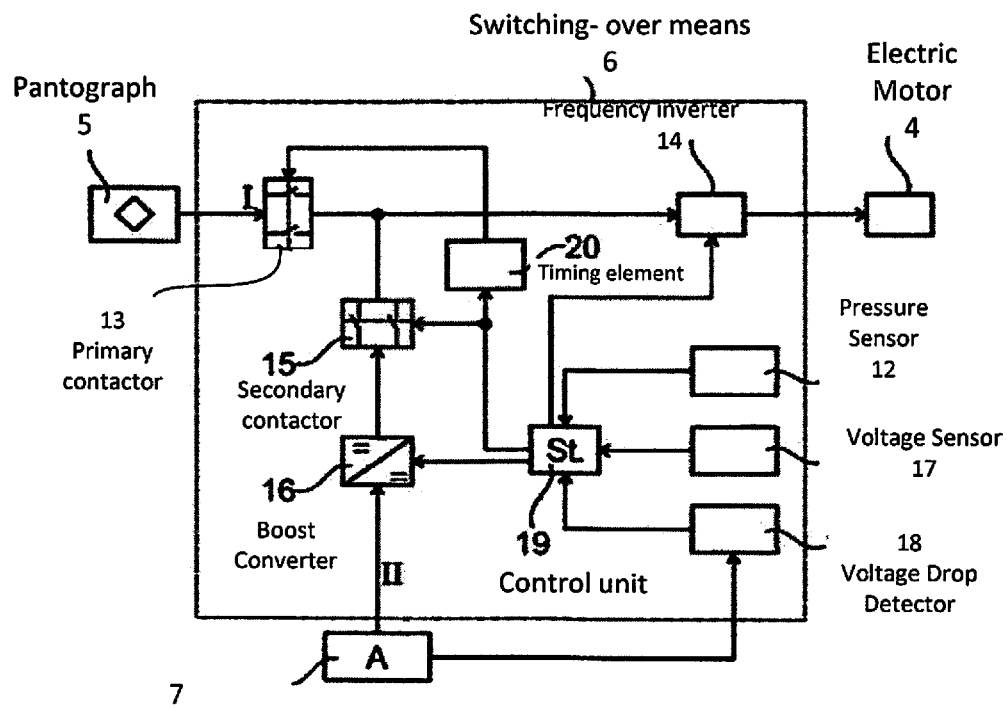
FIG. 2 shows a schematic illustration of the electrical switching-over means for switching the two different energy sources on and off depending on the operating status of the vehicle.

In FIG. 2, the further components of the switching-over means 6 are illustrated. The primary energy source I is connected via a primary contactor 13 and a frequency inverter 14 which is connected downstream for the purpose of adaptation to the electric motor 4 which is embodied as a three-phase motor. A secondary contactor 15 switches off the auxiliary air supply by uncoupling the electric motor 4 from the secondary energy source II if the auxiliary pressure which is determined via the sensor 12 in the auxiliary air vessel 9 (not illustrated here) has reached a minimum pressure value which is sufficient to upgrade the vehicle via auxiliary air. Under these circumstances it is to be assumed that the upgrading of the vehicle by extending the pantograph 5 can be carried out via its pneumatic actuator drive. As an alternative to this, the secondary contactor 15 also switches the secondary energy source II off if the primary energy source I has been connected. For this purpose, a voltage sensor 17 is provided for monitoring the connection status of the pantograph 5. Since under these circumstances the primary energy source I is operationally ready, the secondary energy source II can be uncoupled, and switching over to the primary energy source I takes place. Furthermore, the secondary energy source II is uncoupled from the auxiliary air supply if the voltage thereof has dropped to such a degree that other electrical consumers which are prioritized over the electric motor 4 of the compressor 1 can no longer be supplied with sufficient energy. For this purpose, a voltage drop detector 18 is connected to the vehicle battery 7. The voltage drop detector 18 activates the switching off of the secondary energy source II via the secondary contactor 15 if a detected voltage drop of the vehicle battery 7 falls below a limiting value. A boost converter 16 for increasing the voltage which is predefined by the secondary energy source II is provided between the secondary energy source II and the secondary contactor 15.

The abovementioned switching and switching over conditions are monitored by an electronic control unit 19 which correspondingly actuates the secondary contactor 15 and the primary contactor 13 when at least one of the abovementioned conditions occurs.

During the switching over from the secondary energy source II to the primary energy source I, the primary contactor 13 is actuated by the delay element 20 with offset timing with respect to the preceding switching off of the secondary energy source II via the secondary contactor 15. The output frequency of the frequency inverter 14 is set by the electronic control unit 19 for operating the electric motor 4 in such a way that the latter is operated in accordance with a stored characteristic curve with a higher rotational speed in the case of a relatively low counter-pressure of the primary air or secondary air than in the case of a relatively high counter-pressure.

Disclosed embodiments are not limited to the exemplary embodiment described above. Instead, refinements thereof are also conceivable which are also included in the scope of protection of the following claims. It is therefore also possible, for example, also to implement as a primary energy source I a busbar tap or the like instead of the overhead line tap via the pantograph 5. In this case, a pneumatic actuator drive which is operated with auxiliary air would perform contacting with the busbar and/or the activation of an electrical main switch for supplying the operating voltage of the vehicle. In addition it is also conceivable to carry out switching over from the secondary energy source II to the primary energy source I after the upgrading of the vehicle, or only to switch off the secondary energy source II as a function of events other than those mentioned above, for safety reasons.

LIST OF REFERENCE NUMBERS

1 Compressor
2 Primary air vessel
3 Primary air line
4 Electric motor
5 Pantograph
6 Switching-over means
7 Vehicle battery
8 Switching valve
9 Auxiliary air vessel
10 Non-return valve
11 Pressure sensor
12 Pressure sensor
13 Primary contactor
14 Frequency inverter
15 Secondary contactor
16 Boost converter
17 Voltage sensor
18 Voltage drop detector
19 Control unit
20 Timing element

The invention claimed is:

1. A method for actuating different energy sources for primary and auxiliary air supply of a vehicle, the method comprising:
   generating compressed air for supplying at least one primary air vessel and at least one auxiliary air vessel with at least one compressor driven by a respectively assigned electric motor, wherein the primary air supply uses at least one external primary energy source, and wherein the auxiliary air supply uses an internal secondary energy source, which is weaker in comparison with the at least one external primary energy source;
   switching between the at least one external primary energy source and the internal secondary energy source based on an operating status of the vehicle;
   disconnecting the auxiliary air supply by uncoupling the respectively assigned electric motor from the secondary energy source in response to a pressure in the auxiliary air vessel reaching a minimum pressure value sufficient to upgrade the vehicle by auxiliary air, and/or in response to the primary energy source being connected after upgrading of the vehicle through operation with auxiliary air.

2. The method of claim 1, further comprising uncoupling the secondary energy source from the auxiliary air supply in response to the voltage thereof having dropped to such a degree that other electrical consumers which are prioritized over the electric motor of the compressor can no longer be supplied with sufficient operating energy.

3. The method of claim 1, wherein connection of the primary energy source is performed is delayed relative to the timing of the preceding switching off of the secondary energy source for the auxiliary air supply.

4. The method of claim 1, further comprising setting the output frequency of a frequency inverter for operating the electric motor, which is a three-phase motor, such that the electric motor is operated in accordance with a characteristic curve as a function of the counter-pressure and/or the battery input voltage.

5. A device for actuating different energy sources for primary and auxiliary air supply of a vehicle, the device comprising:
   at least one compressor, driven by a respectively assigned electric motor for supplying a primary air vessel and an auxiliary air vessel with compressed air, wherein an external primary energy source at least partially implements the primary air supply, and an internal secondary energy source, which is weaker in comparison with the external primary energy source, at least partially implements the auxiliary air supply; and
   switching-over means for switching the external primary energy source and the internal secondary energy source on and off depending on the operating status of the vehicle,
   wherein the switching-over means includes a secondary contactor that switches off the auxiliary air supply by uncoupling the electric motor from the secondary energy source in response to pressure in the auxiliary air vessel reaching a minimum pressure value which is sufficient to upgrade the vehicle by auxiliary air, and/or the primary energy source having been connected after upgrading of the vehicle through operation with auxiliary air.

6. The device of claim 5, further comprising a boost converter for increasing the voltage which is output by the secondary energy source, the boost converter being provided between the secondary energy source and the secondary contactor.

7. The device of claim 5, further comprising a frequency inverter is arranged between the secondary contactor and the electric motor, which is a three-phase motor.

8. The device of claim 7, further comprising a control unit provided for operation with the secondary energy source to adapt the voltage of the frequency inverter to the operating voltage of the secondary energy source.

9. The device of claim 7, further comprising a pressure sensor assigned to the auxiliary air vessel and/or a rotational speed sensor assigned to the electric motor for actual value detection for closed-loop actuate of the output frequency of the frequency inverter.

10. The device of claim 5, wherein the primary energy source is connected via a primary contactor and a frequency inverter to the electric motor, which is a three-phase motor.

11. The device of claim 5, wherein the primary energy source includes an overhead line tap and a pantograph or a busbar tap.

12. The device of claim 5, wherein a vehicle battery is provided as the secondary energy source.

13. The device of claim 6, further comprising a control unit provided for operation with the secondary energy source to adapt the voltage of the boost converter to the operating voltage of the secondary energy source.

* * * * *